United States Patent [19]

Saarem et al.

[11] 4,135,696

[45] Jan. 23, 1979

[54] PILOT OPERATED DIAPHRAGM VALVE

[75] Inventors: Myrl J. Saarem, Carson City, Nev.; Dale F. Soukup, Meadow Vista, Calif.

[73] Assignee: Richdel, Inc., Carson City, Nev.

[21] Appl. No.: 737,673

[22] Filed: Nov. 1, 1976

[51] Int. Cl.² .................... F16K 31/385; F16K 31/40
[52] U.S. Cl. ......................................... 251/30; 251/46; 251/42
[58] Field of Search ................... 251/30, 42, 43, 46, 251/45

[56] References Cited

U.S. PATENT DOCUMENTS

| 202,653 | 4/1878 | Hogan | 251/45 |
|---|---|---|---|
| 1,055,161 | 3/1913 | Geissinger | 251/43 X |
| 1,114,431 | 10/1914 | Bopp | 251/43 X |
| 3,367,621 | 2/1968 | Griswold | 251/46 X |
| 3,799,496 | 3/1974 | Esten | 251/46 X |
| 3,967,808 | 7/1976 | Lieding | 251/46 |

*Primary Examiner*—Arnold Rosenthal
*Attorney, Agent, or Firm*—Keith D. Beecher

[57] ABSTRACT

A pilot type diaphragm valve assembly is provided which includes a solenoid-operated pilot valve which may be opened to remove fluid pressure from a chamber in the valve housing causing the main valve to open, and which may be closed to cause a buildup of hydraulic pressure in the valve housing causing the main valve to close. The solenoid-operated pilot valve includes an outlet which may be coupled to a reservoir at atmospheric pressure, or to any other suitable receptacle, to make the pressure differential across the diaphragm within the valve independent of pressure differentials in the fluid flow through the valve so as to obviate instability at low flow rates.

1 Claim, 2 Drawing Figures

PILOT OPERATED DIAPHRAGM VALVE

The valve assembly of the invention will be described as a modification of a pilot-operated diaphragm valve described and claimed in copending application Ser. No. 689,155 filed May 24, 1976 in the name of the present inventors. However, it will become evident as the description proceeds that the concepts of the invention may be used in conjunction with other types of pilot-operated diaphragm valves.

BACKGROUND OF THE INVENTION

Diaphragm valves using solenoid-operated pilots are known. Such a valve is described, for example, in U.S. Pat. No. 3,410,310, which issued Nov. 12, 1968, and which is assigned to the present assignee. In the prior art pilot-operated diaphragm valves, the pressure drop between the inlet and outlet of the valve is the determining factor in the position of the diaphragm. However, at lower flow rates, minimal differential pressure is exerted on the diaphragm, and the diaphragm has a tendency to modulate which produces instability in the system. The valve assembly of the present invention is constructed so that even at the low flow rates through the valve, a substantial pressure differential is established across the diaphragm, in order that stable operation is achieved at all times.

DETAILED DESCRIPTION OF THE ILLUSTRATED EMBODIMENT

Figure 1:
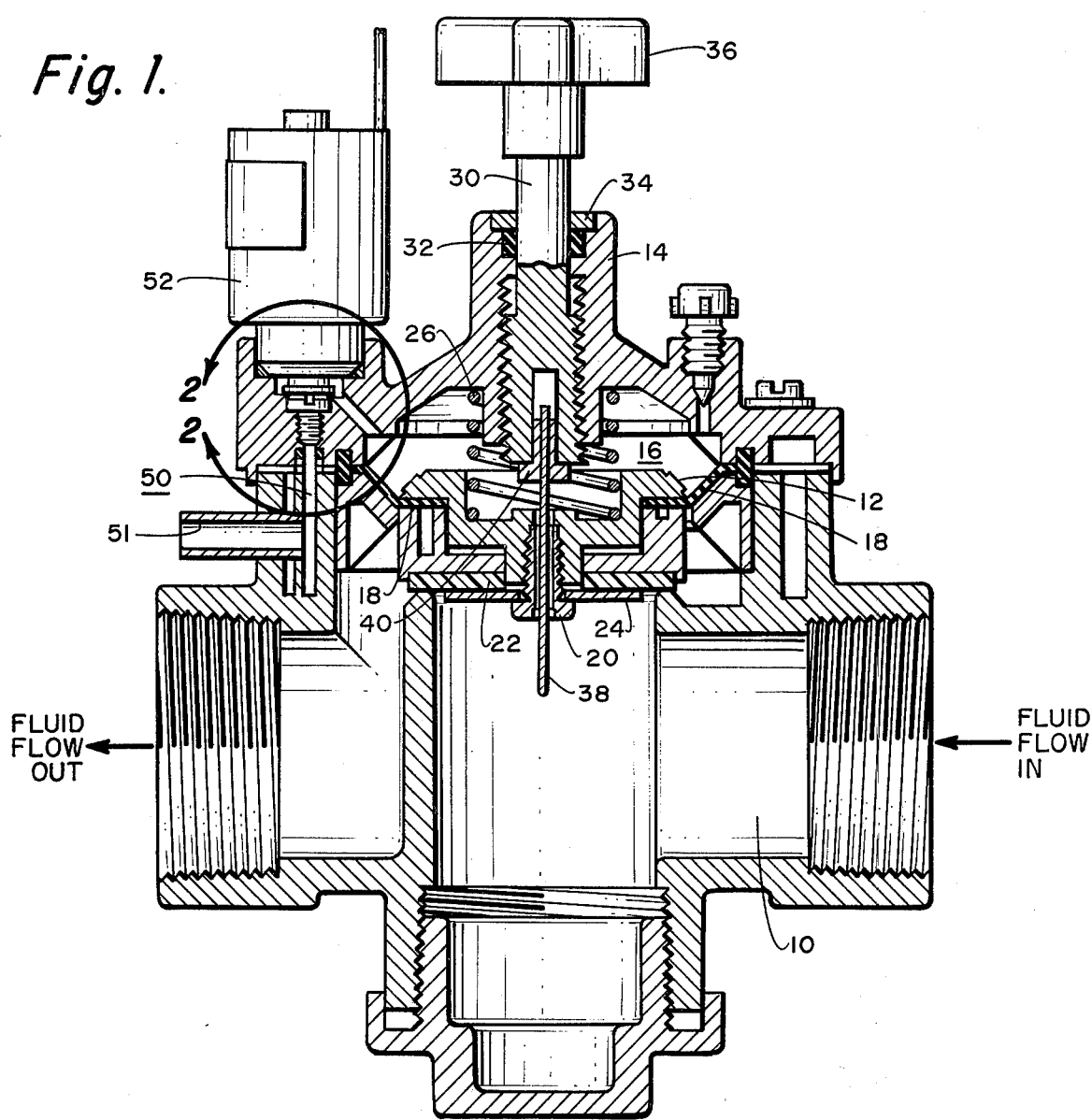
FIG. 1 is a side section showing a valve assembly constructed to incorporate the principles of the invention.

The valve assembly shown in the drawing includes a valve body 10 through which fluid, such as water, flows from right to left, in through an inlet at the right-hand side of the body, and out through an outlet at the left-hand side. A valve actuator 12 is included in the valve assembly, the valve actuator being movable to seat against the valve body 10 to open and close a path between the inlet and outlet, thereby to control the flow of fluid through the valve body. A valve cover 14 is provided, and the cover is secured to the valve body 10 by any appropriate fastening means. The valve cover 14 defines a valve chamber 16 which contains the valve actuator 12. Valve actuator 12 is supported on a diaphragm 18 which is mounted between cover 14 and body 10, and which serves as a seal for valve chamber 16.

A central opening is formed in the valve actuator 12, and a bushing 20 is mounted in the opening. A rubber washer 22 is mounted on the underside of the valve actuator to seat against the valve body 10 when the valve is closed. Washer 22 is held in place by a retainer ring 24 and the bushing 20. A spring 26 is mounted in valve chamber 16 which biases the valve actuator 12 to its closed position.

A handle 30 is threaded into cover 14, and the handle is sealed to the cover by an O-ring 32, the O-ring being held in place by a retainer ring 34. A knob 36 is provided at the upper end of handle 30. The handle may be screwed down against the valve actuator 12 to limit the travel of valve actuator 12, so as to adjust the fluid flow through the valve to any desired rate.

A cleaning pin 38 is mounted in a grommet 50 in the lower end of handle 30, the pin extending down through valve actuator 12 and through bushing 20. The pin is stationary as the valve actuator moves, and it provides a self-cleaning action in a bleed port extending into valve chamber 16 through bushing 20 and through the actuator 12. Fluid from the valve body 10 is introduced through the bleed port into chamber 16, for purposes to be described.

Figure 2:
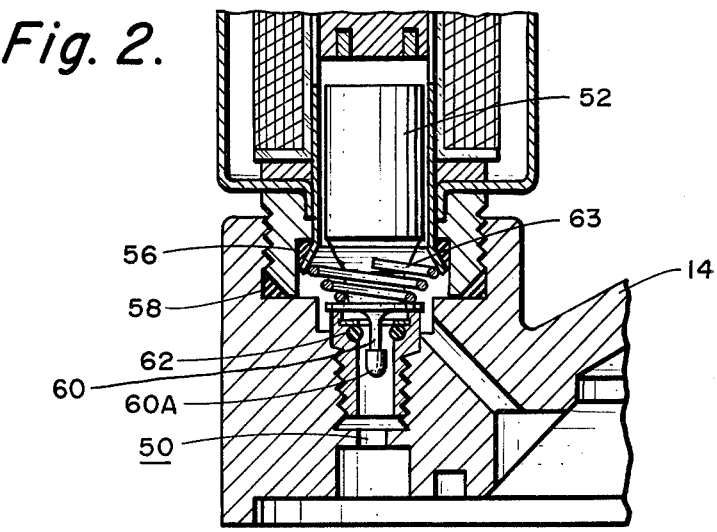
FIG. 2 is an enlarged fragmentary detail within the circle designated 2—2 in FIG. 1.

Cover 14 also defines a pilot discharge port 50, and the flow of fluid from valve chamber 16 through the discharge port 50 is controlled by a solenoid-operated pilot valve 52. As best shown in FIG. 2, the solenoid-operated pilot valve 52 is threaded into cover 14, and is sealed by appropriate seals 56 and 58.

When the solenoid is de-energized, plunger 60 of the pilot valve is biased by spring 63 to the position shown in FIG. 2, in which position the fluid is free to flow from the valve chamber 16 through the discharge port 50. However, when the solenoid is energized, plunger 60 draws an enlarged member 60A attached to its distal end against an O-ring valve seat 62 in the discharge port 50 to close the discharge port 50, as described in detail in copending application Ser. No. 689,155. Therefore, when the pilot solenoid is de-energized, the discharge port 50 is opened so that no pressure build-up can be achieved in valve chamber 16, and the valve actuator 12 is moved upwardly by water pressure in valve body 10 and the valve is held open. However, when the pilot solenoid is energized, the plunger 60 is drawn inwardly, and the enlarged member 60A seats against seat 62, causing the discharge port 50 to be closed. The fluid from the valve body 10 now flows through the bleed port into the valve chamber 16, and the resulting pressure build-up causes the main valve to close.

In the prior art pilot-operated diaphragm valves, the pilot valve discharge port 50 is usually coupled to the outlet of the valve. However, in the assembly of the present invention, the discharge port 50 is coupled to a tubular line 51. Line 51 may extend to a reservoir at atmospheric pressure, so that the fluid discharged from chamber 16 when the pilot valve is opened is discharged at atmospheric pressure; or the tubular member 51 may be coupled to any other receptacle, either at atmospheric pressure, or below, so that when the pilot valve is opened, there is no pressure build-up within the chamber 16.

In the prior art pilot-operated diaphragm valves, discharge port 50 is coupled to the outlet of the valve, so that the pressure drop across the valve between its inlet and outlet is the determining factor in the position of the diaphragm 18. This pressure drop can be extremely low at the lower flow rates, resulting in instability within the valve. For example, if the flow rate through the valve is such that there is a 1 psi loss through the valve, the only pressure differential available to cause the valve actuator to open is the 1 psi drop through the valve. With this minimal differential force, diaphragm 18 will moedulate and produce a system instability. As the flow rate through the prior art valve increases, and eventually as the flow rate increases above a particular threshold, the diaphragm will move to the full open position and out of the range of instability.

The valve assembly of the present invention as shown in FIG. 1 is constructed specifically to overcome the instability of the prior art valves. When the valve of FIG. 1 is operated, or turned "on," the pressure on the top side of the diaphragm 18 is diverted from the normal discharge to the downstream side of the valve through the tubular line 51. For example, the fluid flowing through line 51 may be diverted to a reservoir at atmospheric pressure, so that the pressure differential across diaphragm 18 is changed radically as compared with the prior art valves. Then, for example, if the inlet pressure of the valve is at 20 psi and the outlet pressure is at 19 psi, and if the top side of diaphragm 18 is vented to atmosphere at 0 psi gage pressure by the tubular line 51, the differential across the diaphragm will be 20 psi so that the diaphragm will open fully with no modulation and with no instability. This is compared with a pressure differential across the diaphragm of 1 psi in the prior art assemblies.

One area of utilization of the valve of the invention is in pumping systems, in which the valve is coupled to the downstream side of a pump, and is used to control the flow of fluid in a line connected to the pump outlet. If tube 51 is connected directly to the pump inlet, the flow recirculates from the top side of diaphragm 18 back to the pump inlet. In this case, the pressure differential across the diaphragm is increased even more, because the pump inlet pressure is at partial vacuum.

While a particular embodiment of the invention has been shown and described, modifications may be made. It is intended in the claims to cover the modifications which come within the spirit and scope of the invention.

What is claimed is:

1. A valve assembly for controlling liquid flow, said valve assembly including: a casing defining an inlet and an outlet, and also defining a valve chamber, an auxiliary chamber, and a conduit interconnecting the valve chamber and the auxiliary chamber, said auxiliary chamber having a discharge port for discharging liquid from said valve chamber and from said auxiliary chamber; means defining a bleed port for introducing liquid into said valve chamber; a valve actuator movable in said valve chamber between a first position in which the valve defines an open path between said inlet and said outlet, and a second position in which the valve closes said path; a diaphragm supporting said valve actuator in said valve chamber and providing a seal for said valve chamber; a solenoid operated valve positioned in said auxiliary chamber and including a plunger extending into said discharge port to permit the discharge from the valve chamber when the pilot valve is in an open position so that there is insufficient pressure exerted on the valve actuator to hold the valve actuator in its second position thereby normally to establish the valve actuator in its first position; a valve seat positioned in said discharge port, and said plunger having a distal end positioned to seat against said valve seat when the pilot valve is closed, said pilot valve serving to block the flow of liquid through said discharge port when closed so as to cause a pressure build-up in said valve chamber causing said valve actuator to move to its second position; and an outlet line coupled to said discharge port and to the inlet of a pump to discharge liquid from the discharge port to a point independent of said valve outlet so as to establish a material pressure differential across the diaphragm independent of pressure differentials in the liquid flow through the valve so as to obviate instability at low flow rates.

* * * * *